United States Patent [19]

Meyer

[11] Patent Number: 6,038,933
[45] Date of Patent: Mar. 21, 2000

[54] MULTI-AXIS LOAD CELL

[75] Inventor: Richard A. Meyer, Carver, Minn.

[73] Assignee: MTS Systems Corporation, Eden Prairie, Minn.

[21] Appl. No.: 08/892,914

[22] Filed: Jul. 15, 1997

[51] Int. Cl.[7] .................................................... G01L 1/22
[52] U.S. Cl. ........................................ 73/862.045; 73/146
[58] Field of Search ....................... 73/862.042, 862.044, 73/862.627, 862.045, 148

[56] References Cited

U.S. PATENT DOCUMENTS

| | | | |
|---|---|---|---|
| 3,377,849 | 4/1968 | Lebow | 73/134 |
| 3,618,376 | 11/1971 | Shull et al. | 73/133 |
| 3,693,425 | 9/1972 | Starita et al. | 73/133 |
| 3,771,359 | 11/1973 | Shoberg | 73/141 A |
| 3,780,573 | 12/1973 | Reus | 73/146 |
| 3,867,838 | 2/1975 | Gerresheim | 73/133 R |
| 4,297,877 | 11/1981 | Stahl | 73/146 |
| 4,448,083 | 5/1984 | Hayashi | 73/862.042 |
| 4,483,203 | 11/1984 | Capper | 73/862.04 |
| 4,488,441 | 12/1984 | Ramming | 73/862.04 |
| 4,493,220 | 1/1985 | Carignan et al. | 73/862.66 |
| 4,499,759 | 2/1985 | Hull | 73/146 |
| 4,550,617 | 11/1985 | Fraignier et al. | 73/862.04 |
| 4,573,362 | 3/1986 | Amlani | 73/862.04 |
| 4,640,138 | 2/1987 | Meyer et al. | 73/862.044 |
| 4,672,855 | 6/1987 | Schmieder | 73/862.044 |
| 4,748,844 | 6/1988 | Yoshikawa et al. | 73/146 |
| 4,763,531 | 8/1988 | Dietrich et al. | 73/862.04 |
| 4,821,582 | 4/1989 | Meyer et al. | 73/862.044 |
| 4,823,618 | 4/1989 | Ramming | 73/862.044 |
| 5,313,828 | 5/1994 | Kötzle et al. | 73/146 |
| 5,315,882 | 5/1994 | Meyer et al. | 73/862.044 |
| 5,400,661 | 3/1995 | Cook et al. | 73/862.043 |
| 5,540,108 | 7/1996 | Cook et al. | 73/862.041 |

FOREIGN PATENT DOCUMENTS

| | | |
|---|---|---|
| 2 302 540 | 7/1974 | Germany . |
| 2 096 777 | 10/1982 | United Kingdom . |

OTHER PUBLICATIONS

Milton J. Lebow, "Summer Instrument–Automation Conference and Exhibit —Toronto, Ontario, Canada", Instrument Society of America Conference Preprint, Jun. 5–8, 1961.

G. Hirzinger, "Direct Digital Robot Control Using A Force–Torque–Sensor", IFAC Symposium on Real Time Digital Control Applications, Guadalajara, Mexico, Jan. 15–21, 1983.

Assorted Astek Engineering, Inc. brochures, 1983.

A. Rupp, W. Diefenbach, V. Grubisic, "Erfassung der mehraxialen Fahrbetriebsbelastungen mit dem MeBrad 'VELOS'", ATZ Automobiltechnische Zeitschrift 96, 1994, pp. 764–768.

A. Rupp, V. Grubisic, "Reliable and Efficient Measurement of Suspension Loads on Passenger Cars and Commercial Vehicles", reprint from "Advanced Measurement Techniques and Sensory Systems for Automotive Applications: Accuracy and Reliability", Proceedings of the 1st International Conference and Exhibition, Ancona 29–30.6. 1995, Hrsg. ATA Orbassano (1995), S. 263–273.

C. Higashijima, S. Awazu, "Development of multiaxial wheel hub dynamometer", JSAE Review, vol. 16, No. 1, Jan. 1995.

(List continued on next page.)

*Primary Examiner*—Ronald Biegel
*Attorney, Agent, or Firm*—Westman, Champlin & Kelly, P.A.; S. Koehler

[57] ABSTRACT

A load cell body for measuring components of force and moment in plural direction includes an integral assembly having a rigid central hub and a rigid annular ring concentric with the central hub. At least three radial tubes extends radially along corresponding longitudinal axes from the central hub to the annular ring. Flexure members join the radial tubes to the annular ring. Each flexure member is compliant for displacement of each corresponding radial tube along the corresponding longitudinal axis. As a load cell, a strain sensor mounted on each radial tube measures strain therein.

35 Claims, 10 Drawing Sheets

OTHER PUBLICATIONS

Brochure: Wheel force transducer—the key for real world simulation, Schenck ATC, Apr. 1995.

"Flexible Wheel Force Transducer System for Road Load Data Acquisition", IGEB, Apr. 1995.

TML pam E–670 A: "TML 6–Component Wheel Force Measuring Equipment SLW–A/MFT–106", Texas Measurements, Inc.

"Unique Solutions to Measurement Problems", Robert A. Denton, Inc.

"MMS–6800", Nissho Electric Works, Col. Ltd.

Brochure: "Kistler Vehicle Engineering News", May 1997.

Walter Weiblen, Thomas Hofmann, "Evaluation of Different Designs of Wheel Force Transducers", SAE Technical Paper Series, International Congress and Exposition, Feb. 23–26, 1998, pp. 1–10.

MULTI-AXIS LOAD CELL

BACKGROUND OF THE INVENTION

The present invention relates to a load cell that transmits and measures linear forces along and moments about three orthogonal axes. More particularly, a compact load cell body is disclosed having a rigid central hub, a rigid annular ring concentric with the hub and radial members extending between the central hub and the annular ring. The load cell body has improved performance and characteristics of which can be easily adjusted to vary the sensitivity of the load cell.

Transducers or load cells for determining forces along and moments about three orthogonal axes are known. Two such load cells are disclosed in U.S. Pat. Nos. 4,640,138 and 4,821,582. U.S. Pat. No. 4,640,138 illustrates a multiple axis load-sensitive transducer having inner and outer members that are joined by a pair of axially spaced spiders. The spiders comprise arms that are integral with the inner member and are connected to the outer member by flexible straps that have longitudinal lengths with the ends of the straps fixed to the outer member. The arms of the spiders are fixed to the center of the associated strap. Loads are sensed as a function of bending on the spider arms.

U.S. Pat. No. 4,821,582 illustrates a load transducer that measures linear forces in three axes and moments about two of the axes. The transducer has inner and outer structures connected by load-sensitive spider arms or shear beams. The outer ends of the spider are connected to outer lengths which are stiff when the inner structure is loaded in a direction along an axis perpendicular to the plane of the spider.

Other, more compact, load cells are described in United Kingdom Patent Application GB 2096777 A. These load cells include a central hub portion and an annular ring portion with four radial spoke portions connecting the hub and ring portions and having suitable strain gauges adhered thereon. A prior art load cell having this construction is discussed in GB 2096777 A but does not measure moments applied about axes extending through the spokes. United Kingdom patent application GB 2096777 A discloses solid spokes having trunk sections and end sections. Each end section has a "width" dimension that is less than the corresponding trunk section. The reduced width of each end section is sufficiently small to make it flexible with respect to a twisting force about the extending direction of the spoke.

There is an ongoing need to provide an improved compact load cell, which is easy to manufacture and measures components of force and moment in plural directions.

SUMMARY OF THE INVENTION

A load cell body for transmitting forces and moments includes an integral assembly having a rigid central hub and a rigid annular ring concentric with the central hub. At least three radial tubes extend radially along corresponding longitudinal axes from the central hub to the annular ring. Flexure members join the radial tubes to the annular ring. Each flexure member is compliant for displacement of each corresponding radial tube along the corresponding longitudinal axis.

Another aspect of the present invention is a load cell having a rigid central hub, a rigid annular ring concentric with the central hub and a plurality of radial tubes extending radially along corresponding longitudinal axes from the central hub to the annular ring. Each tube has a non-rectangular outer surface in section perpendicular to the longitudinal axis and includes a plurality of spaced-apart wall portions of reduced thickness to concentrate stress therein.

Another aspect of the present invention is a method of making a load cell body for transmitting forces and moments in plural directions. The method comprises the steps of: fabricating from a single block of material, an integral assembly with a rigid central hub, a rigid annular ring concentric with the hub, at least three radial members extending from the central hub to the annular ring wherein the flexure member extends between an end of each radial member to the annular ring, the flexure member being compliant for displacements of each corresponding radial member along a corresponding longitudinal axis of each radial member; and forming a bore within each radial member along the corresponding longitudinal axis, wherein sensitivity of the load cell is a function of the diameters of the bores formed in the radial members. Preferably, the step of fabricating further includes forming an aperture in the annular ring that is aligned with each corresponding bore formed in the radial member.

DETAILED DESCRIPTION OF THE PREFERRED EMBODIMENTS

Figure 1:
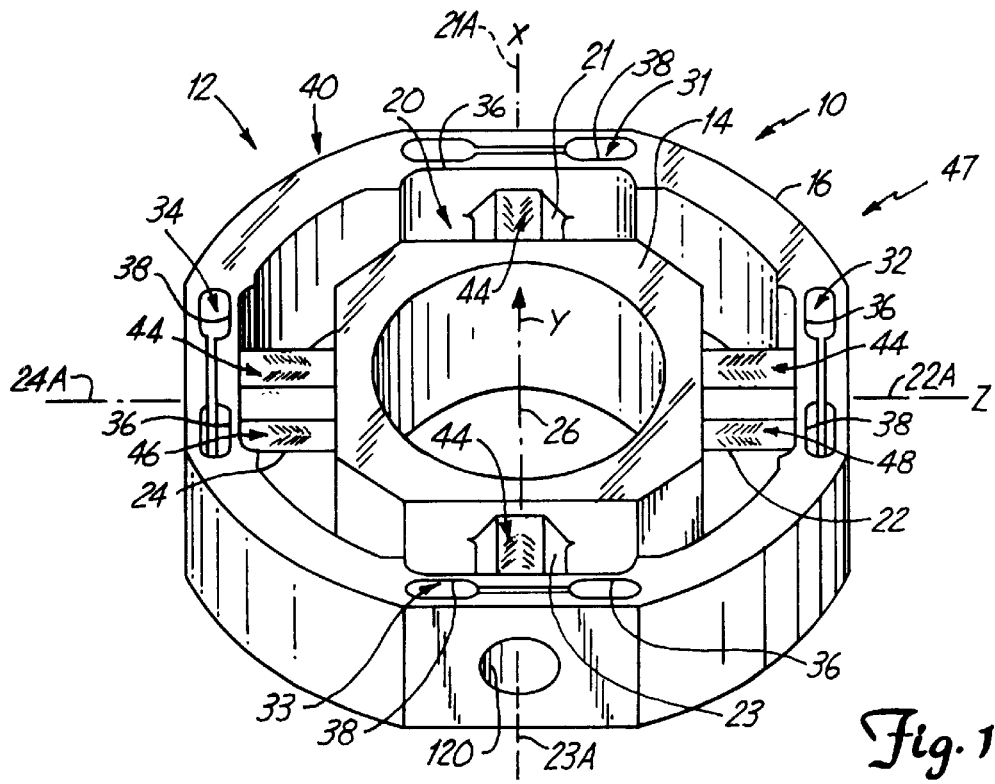
FIG. 1 is a perspective view of a load cell of the present invention.

FIG. 1 illustrates a first embodiment of a load cell 10 of the present invention. The load cell 10 preferably includes an integral body 12 of the present invention fabricated from a single block of material. The body 12 includes a rigid central hub 14 and a rigid annular ring 16 that is concentric with the central hub 14. A plurality of radial tubes 20 join the central hub 14 to the annular ring 16. In the embodiment illustrated, the plurality of radial tubes 20 comprises four tubes 21, 22, 23 and 24. Each of the tubes 21–24 extend radially from the central hub 14 toward the annular ring 16 along corresponding longitudinal axes 21A, 22A, 23A and 24A. Preferably, axis 21A is aligned with axis 23A, while axis 22A is aligned with axis 24A. In addition, axes 21A and 23A are perpendicular to axes 22A and 24A. Although illustrated wherein the plurality of radial tubes 20 equals four, it should be understood that any number of tubes three or more can be used to join the central hub 14 to the annular ring 16. Preferably, the plurality of radial tubes 20 are spaced at equal angular intervals about a central axis indicated at 26.

Flexure members 31, 32, 33 and 34 join an end of each radial tube 21–24, respectively, to the annular ring 16. The flexure members 31–34 are compliant for displacements of each corresponding radial tube 21–24 along the corresponding longitudinal axes 21A–24A. In the embodiment illustrated, the flexure members 31–34 are identical and include integrally formed flexure straps 36 and 38. The flexure straps 36 and 38 are located on opposite sides of each longitudinal axis 21A–24A and join the corresponding radial tube 21–24 to the annular ring 16.

A plurality of strain sensors 40 are mounted on the plurality of tubes 20 to sense strain therein. Although the plurality of sensors 40 can be located on the plurality of radial tubes 20 to provide an indication of bending stresses therein, preferably the strain sensors are mounted conventionally to provide an output signal indicative of shear stresses in the walls of the plurality of radial tubes 20. In the embodiment illustrated, four sets of strain sensors are provided on each tube 21–24, preferably, approximately at the center of the longitudinal length of each tube. A first pair of strain sensors 44 is provided on an upwardly facing portion of each radial tube 21–24. A second pair of strain sensors, not shown, is mounted on a downwardly facing surface approximately 180 degrees from the first pair of strain sensors 44. The first and second pairs of strain sensors on each tube 21–24 are connected in a conventional Wheatstone bridge to form a first sensing circuit on each radial tube 21–24. A third pair of strain sensors 46 is mounted approximately 90 degrees from the first pair of strain sensors 44 while a fourth pair of strain sensors 48 is mounted approximately 180 degrees from the third pair of strain sensors 46. The third and fourth pairs of strain sensors on each tube 21–24 are also connected in a conventional Wheatstone bridge to form a second sensing circuit on each radial tube 21–24. Commonly, the plurality of sensors 40 comprise resistive strain gages. However, other forms of sensing devices such as optically based sensors or capacitively based sensors can also be used.

In the embodiment illustrated having four radial tubes 21–24, eight individual shear-sensing Wheatstone bridges are used. The number of sensing circuits can be increased or decreased, depending on the number of radial tubes used. However, at least three radial tubes are preferred.

Output signals from the strain sensors 40 are indicative of force and moment components transmitted between the central hub 14 and the annular ring 16 in six degrees of freedom. For purposes of explanation, an orthogonal coordinate system 47 can be defined wherein an X-axis is aligned with the longitudinal axes 21A and 23A; a Z-axis is aligned with the longitudinal axes 22A and 24A; and a Y-axis is aligned with the central axis 26.

In the embodiment illustrated, the load cell 10 measures eight forces on the plurality of tubes 20. The eight forces are then transformed to provide forces along and moments about the axes of the coordinate system 47. Specifically, force along the X-axis is measured as principal strains due to shear stresses created in the radial tubes 22 and 24 since the flexure members 31 and 33 on the ends of the radial tubes 21 and 23 are compliant in this direction. This can be represented as:

$$F_X = F_{22X} + F_{24X}$$

where the first sensing circuits having strain sensors 44 on tubes 22 and 24 provide the output signals.

Similarly, force along the Z-axis is measured as principal strains due to shear stresses created in the radial tubes 21 and 23 since the flexure members 32 and 34 on the ends of the tubes 22 and 24 are compliant in this direction. This can be represented as:

$$F_Z = F_{21Z} + F_{23Z}$$

where the first sensing circuits having strain sensors 44 on tubes 21 and 23 provide the output signals.

Force along the Y-axis or central axis 26 is measured as principal strains due to shear stresses created in all of the radial tubes 21–24. This can be represented as:

$$F_Y = F_{21Y} + F_{22Y} + F_{23Y} + F_{24Y}$$

where the second sensing circuits having strain sensors 46 and 48 on tubes 21–24 provide the output signals.

An overturning moment about the X-axis is measured as principal strains due to shear stresses created in the radial tubes 22 and 24 from the opposed forces applied thereto. The radial tubes 21 and 23 are substantially stiff for an overturning moment about the X-axis. This can be represented as:

$$M_X = F_{22Y} - F_{24Y}$$

where the second sensing circuits including strain sensors 46 and 48 on tubes 22 and 24 provide the output signals.

Likewise, an overturning moment about the Z-axis is measured as principal strains due to shear stresses created in the radial tubes 21 and 23 from the opposed forces applied thereto. The radial tubes 22 and 24 are substantially stiff for an overturning moment about the Z axis. This can be represented by:

$$M_Z = F_{21Y} - F_{23Y}$$

where the second sensing circuits including strain sensors 46 and 48 on the tubes 21 and 23 provide the output signals.

An overturning moment about the Y-axis is measured as principal strains due to shear stresses created in all of the radial tubes 21–24. This can be represented as:

$$M_Y = (F_{22X} - F_{24X}) + (F_{21Z} - F_{23Z})$$

where the first sensing circuits including strain sensors 44 on tubes 21–24 provide the output signals.

It should be understood that the number of strain sensors 40 and the number of sensing circuits can be reduced if measured forces and moments of less than six degrees of freedom is desired.

Figure 2:
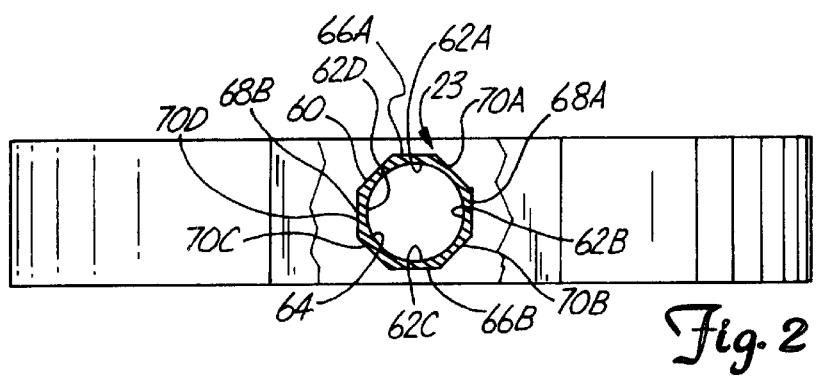
FIG. 2 is a side elevational view of a load cell with a portion removed to show a radial tube in section.

In a preferred embodiment, each of the radial tubes 21–24 include a plurality of spaced-apart wall portions of reduced thickness to concentrate stress therein. Referring to FIG. 2 and radial tube 23 by way of example, the radial tube 23 has a non-rectangular outer surface 60 wherein the wall portions of reduced thickness are indicated at 62A, 62B, 62C and 62D. The wall portions of reduced thickness 62A–62D are formed by a cylindrical bore 64 in the radial tube 23 and a first pair of parallel planar surfaces 66A and 66B facing in opposite directions and a second set of planar surfaces 68A and 68B also facing in opposite directions. The second set of planar surfaces 68A and 68B are substantially orthogonal to the first set of planar surfaces 66A and 66B such that the planar surfaces of the first set and the second set are alternately disposed about the corresponding longitudinal axis 23A. Although illustrated wherein the thickness of the portions 62A–62D are approximately equal, if desired, the thickness can be made different to provide desired sensitivity in selected directions. Preferably, the thickness of portion 62A should be approximately equal to portion 62C, and the thickness of portion 62B should be approximately equal to portion 62D.

Figure 3:
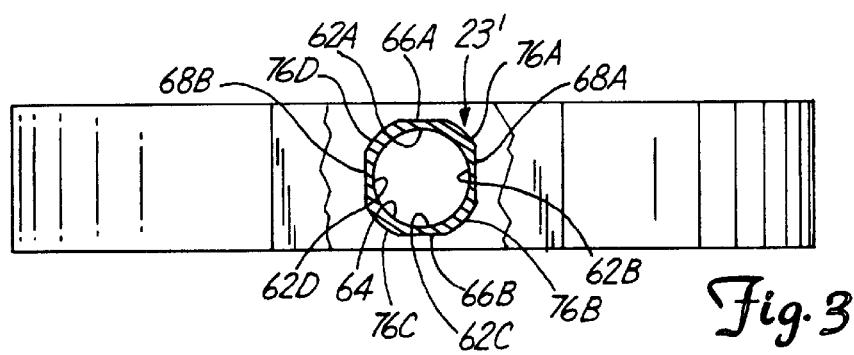
FIG. 3 is a side elevational view of the load cell with a portion removed to show an alternative radial tube in section.

The strain sensors 44 of the first sensing circuit are mounted on the first pair of parallel planar surfaces 66A and 66B, while the strain sensors 46 and 48 of the second sensing circuit are mounted on the second set of planar surfaces 68A and 68B. Planar mounting surfaces are preferred because measured output signals lower hysteresis and lower creep gage bonding due to uniform gage clamp pressure on flat surfaces versus curved mounting surfaces, which locks residue stress in gage. Also, alignment scribing and affixing of the gages to the scribed lines is more difficult on a curved surface. The non-rectangular outer surface 60 is also beneficial because this form concentrates stress in portions of the radial tube 23, which are proximate the strain sensors 40. Although a tube having a rectangular cross-section (four flat surfaces that intersect at the corners) can be used, significant stress concentration occurs at the intersection of the flat surfaces where strain sensors cannot be easily mounted. Thus, performance is substantially reduced. In contrast, the non-rectangular radial tube 23 illustrated in FIG. 2 includes planar surfaces 70A, 70B, 70C and 70D that extend between each planar surface of the first set and the successive planar surface of the second set. In a preferred embodiment, the planar surfaces 66A, 66B, 68A, 68B and 70A–70D preferably form an octagon in cross-section. Forming each of the radial tubes 21–24 with an octagonal outer surface 60 simplifies construction and reduces manufacturing costs since the planar surfaces can be easily machined. Although illustrated wherein one planar surface extends between each planar surface of the first set and successive surface of the second set, for example, planar surface 70A, it should be understood that a plurality of intervening planar surfaces can be used. Similarly, the flat planar surfaces 70A–70D can be replaced with curved wall portions 76A, 76B, 76C and 76D to form a non-rectangular radial tube 23' as illustrated in FIG. 3. Unlike a tubular structure having an annular wall of uniform thickness, the radial tube 23' also has spaced-apart portions of reduced wall thickness 62A–62D created by the flat surfaces 66A, 66B, 68A and 68B that concentrate stress therein similar to the octagonal cross-section.

The octagonal cross-section of radial tube 23 or the cross-section of radial tube 23' provides approximately 14% higher output (signal to noise ratio) and sensitivity than a tube with uniform annular wall thickness of the same area. This can be shown by comparing the shear stress created in the octagonal tube 23 versus a tube of uniform annular wall thickness.

The shear stress T at any point q in a beam is given by the following equation:

$$T = \frac{V A' z'}{I b}$$

where V is the vertical shear at any section containing q, A' is the area of that part of the section above (or below) q, z' is the distance from the neutral axis to the centroid of A' and b is the net breadth of the section measured through q (herein two times the wall thickness of the tube), and I is the moment of inertia.

For a octagonal tube having an inner bore radius of 0.650 inches, a minimum wall thickness (portions 62A–62D) of 0.150 inches and using a point q on the neutral axis, A' is approximately equal to 0.398 square-inches, z' is approximately equal to 0.471 inches, I is approximately equal 0.219 inches$^4$ and b is approximately equal to 0.300 inches. Assuming a vertical shear force of 1,000 pounds, the shear stress for the octagonal tube is approximately 2,853 psi.

Assuming an inner bore radius of 0.650 inches (inner diameter equal to 1.300 inches) for a tube of uniform annular wall thickness, an outer diameter would equal 1.643 inches to have approximately the same area as the octagonal tube given above. For a point q on the neutral axis, the centroid z' is approximately equal to 0.471 inches, I is approximately equal to 0.218 inches$^4$ and b is approximately equal to 0.343 inches. Assuming the same vertical shear force of 1,000 pounds, the shear stress for the tube with uniform annular wall thickness, as given by the equation above, approximately equals 2,504 psi. Shear stress concentration for the octagonal tube is thus approximately 14% greater than that of the tube having uniform annular wall thickness. Increased stress concentration proximate the sensors 40 provides higher signal to noise ratio and higher sensitivity. In addition, this improved performance is obtained with a higher moment of inertia and bending strength ratio. In addition, fatigue life is increased. For example, if the body 12 is made from 2024 T3 aluminum, the fatigue life increases from $10^6$ cycles for a tube having uniform annular wall thickness to $4 \times 10^6$ cycles for an octagonal tube. This provides more output for the same fatigue life. Other suitable materials include titanium, 4340 steel, 17-4PH stainless steel or other high strength materials. Many of the advantages described above also apply to the tube 23' illustrated in FIG. 3.

The load cell 10 is particularly well suited for measuring the force and moment components of a rolling wheel. A second embodiment 10' of the present invention is illustrated in FIGS. 4, 5, 6 and 7. The load cell 10' is substantially similar to the load cell 10 wherein like components have been identified with the same reference numerals.

Figure 4:
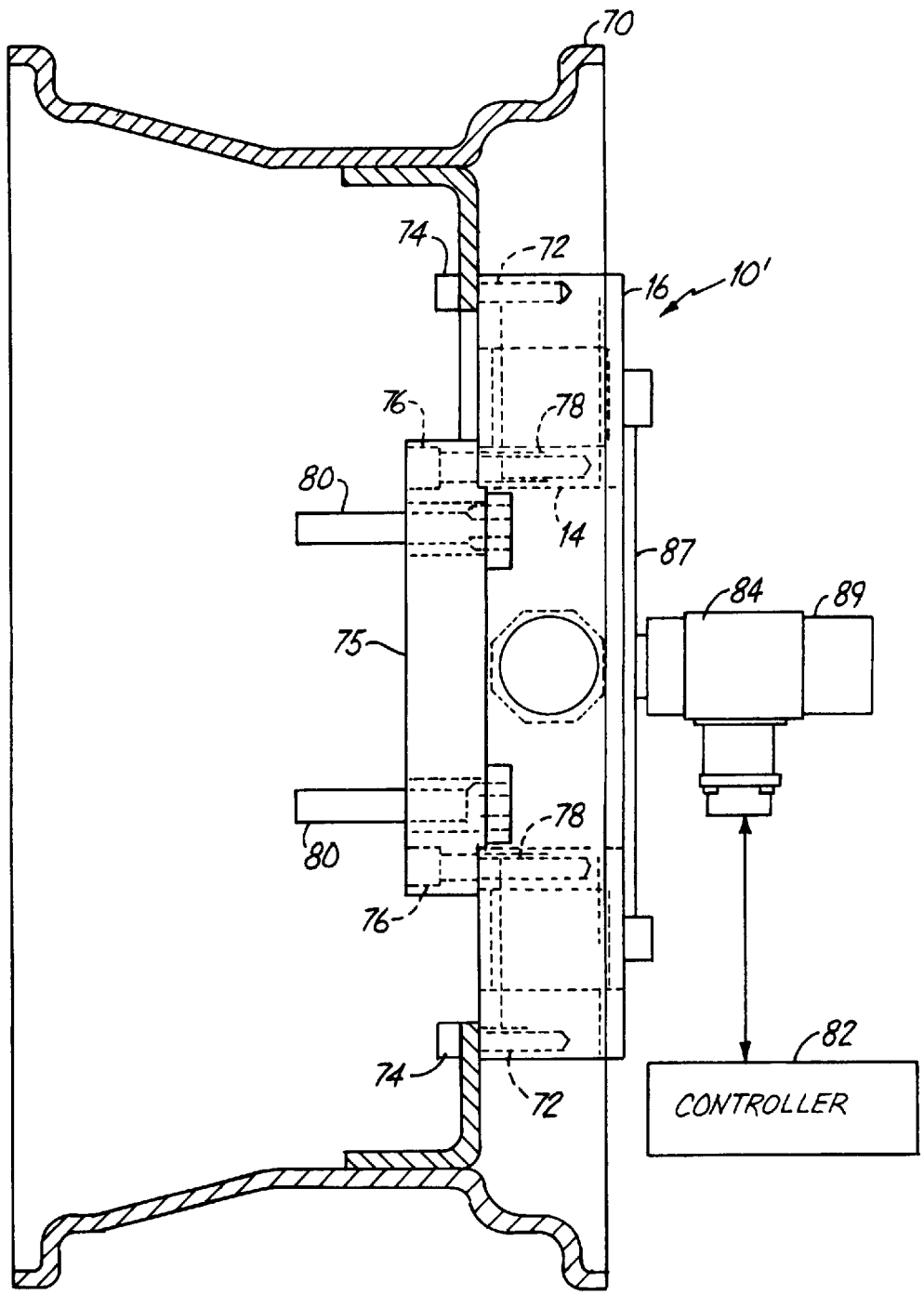
FIG. 4 is a side elevational view of the load cell mounted to a tire rim illustrated in section.

Referring to FIG. 4, the load cell 10' replaces a center portion of a tire rim 70. The annular ring 16 includes threaded apertures 72 that receive a plurality of fasteners 74, which secure the load cell 10' to the tire rim 70. An inner mounting plate 75 is fastened to the central hub using a plurality of fasteners 76 secured in corresponding threaded apertures 78 provided in the central hub 14 (FIG. 4). The inner mounting plate 75 is secured on a vehicle spindle, not shown, using suitable fasteners 80. Power is supplied to and output signals are obtained from the plurality of strain sensors 40 by a controller 82 through a slip ring assembly 84, if the tire rim 70 rotates or partially rotates. The controller 82 calculates, records and/or displays the force and moment components measured by the load cell 10'.

Figure 7:
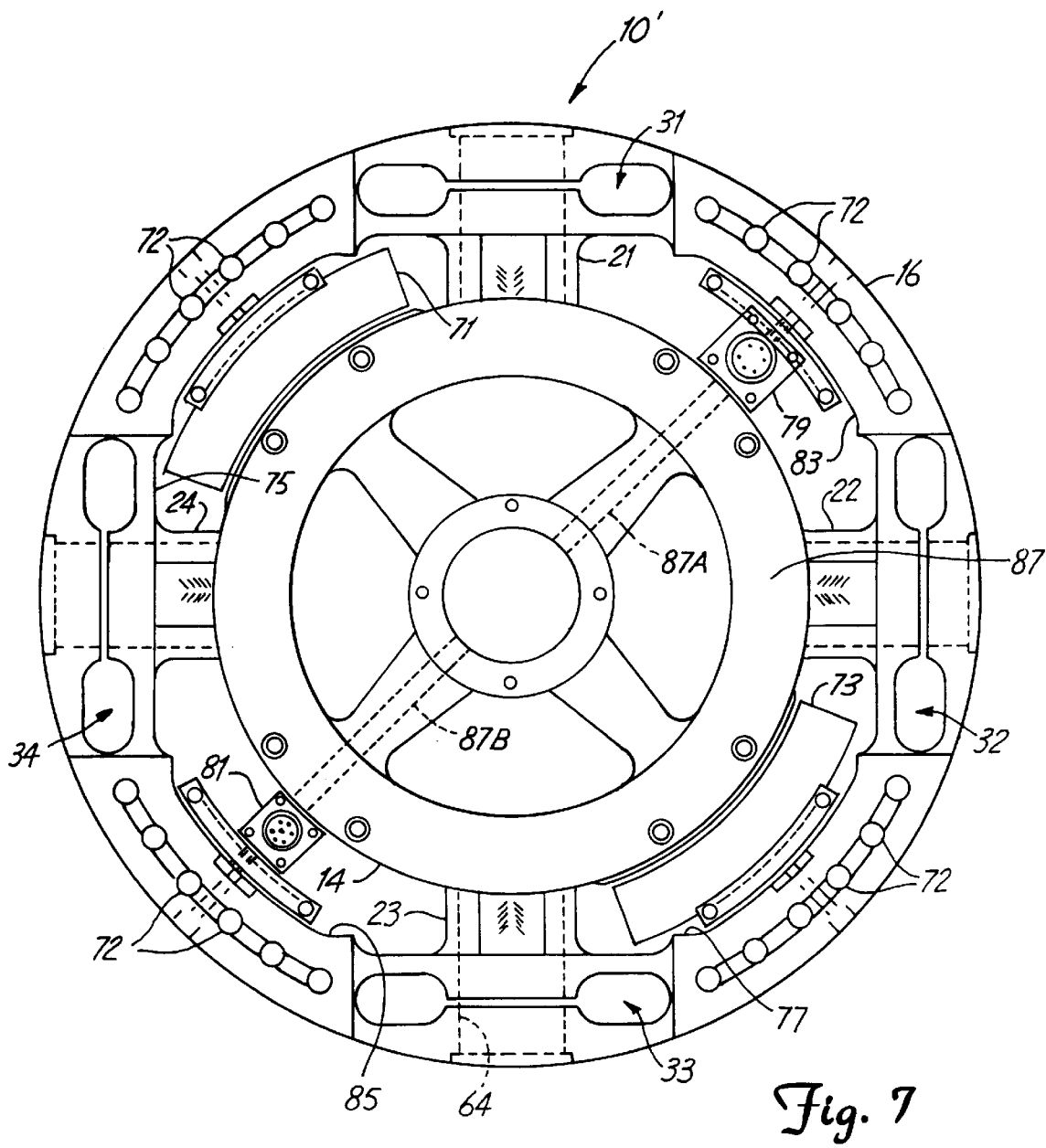
FIG. 7 is a top plan view of the second embodiment with a slip ring mounting plate and connectors.

In a preferred embodiment, the load cell 10 includes amplifying circuits 71 and 73 mounted in recesses 75 and 77, respectively, as illustrated in FIG. 7. The amplifying circuits 71 and 73 are connected to the sensing circuits on the radial tubes 21–24 and amplify the output signals prior to transmission through the slip ring assembly 84. By amplifying the output signals, problems associated with noise introduced by the slip ring assembly 84 are reduced. Connectors 79 and 81 mounted in apertures 83 and 85 connect the amplifying circuits 71 and 73 to the slip ring assembly 84. A mounting plate 87 mounts the slip ring assembly 84 to the central hub 14. Passageways 87A and 87B are provided in the mounting plate 87 to carry conductors from the slip ring assembly 84 to the connectors 79 and 81. An encoder 89 provides an angular input signal to the controller 82 indicative of the angular position of the load cell 10'.

Figure 8:
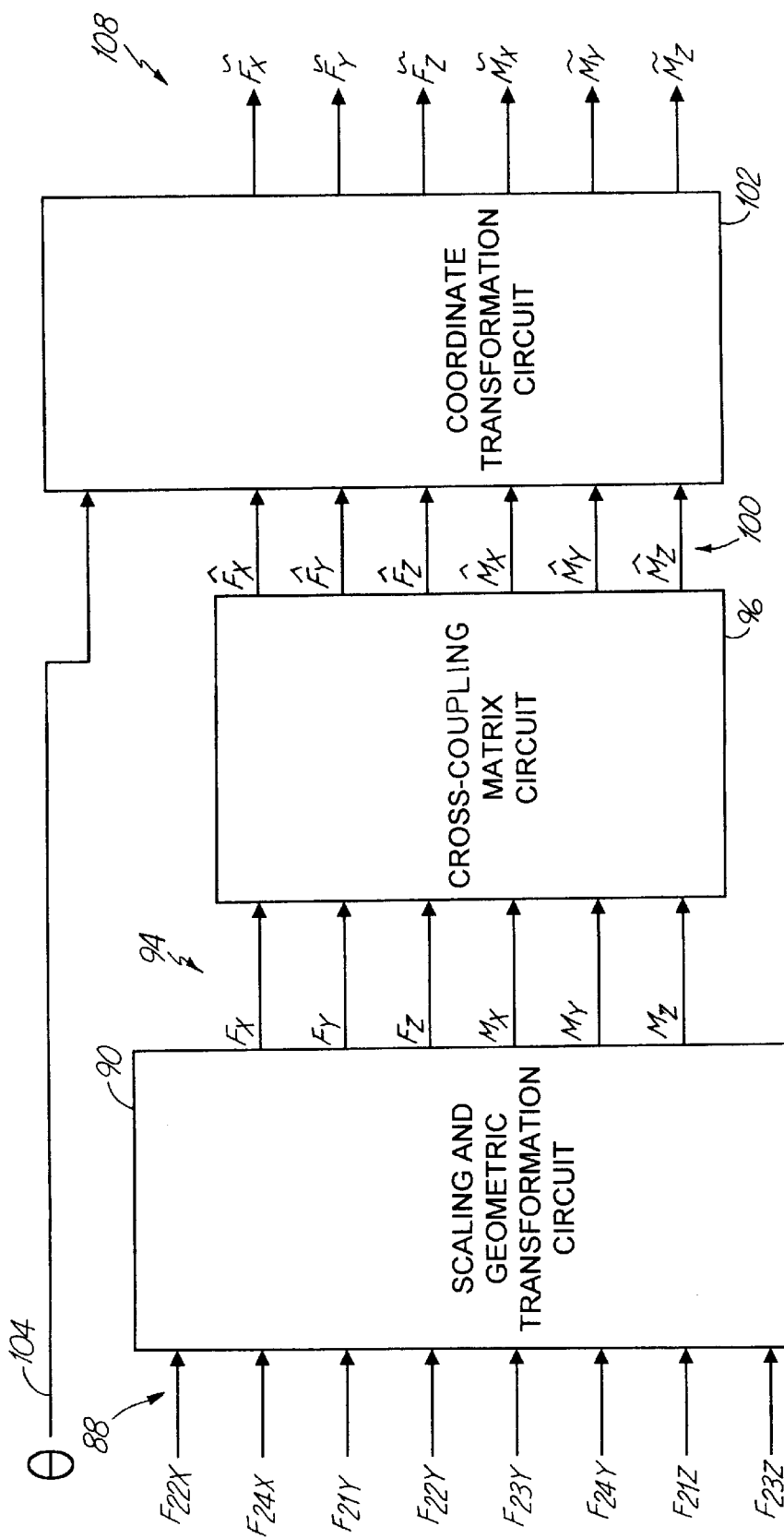
FIG. 8 is a general block diagram of a controller.

FIG. 8 illustrates generally operations performed by the controller 82 to transform the output signals 88 received from the eight individual sensing circuits on the tubes 21–24 to obtain output signals 108 indicative of force and moment components with respect to six degrees of freedom in a static orthogonal coordinate system. As illustrated, output signals 88 from the sensing circuits are received by a scaling and geometric transformation circuit 90. The scaling and geometric transformation circuit 90 adjusts the output signals 88 to compensate for any imbalance between the sensing circuits. Circuit 90 also combines the output signals 88 according to the equations given above to provide output signals 94 indicative of force and moment components for the orthogonal coordinate system 47 (FIG. 1).

A cross-coupling matrix circuit 96 receives the output signals 94 and adjusts the output signals so as to compensate for any cross-coupling effects. A coordinate transformation circuit 102 receives output signals 100 from the cross-coupling matrix circuit 96 and an angular input 104 from an encoder or the like. The coordinate transformation circuit 102 adjusts the output signals 100 and provides output signals 108 that are a function of a position of the load cell 10' so as to provide force and moment components with respect to a static orthogonal coordinate system.

Figure 9:
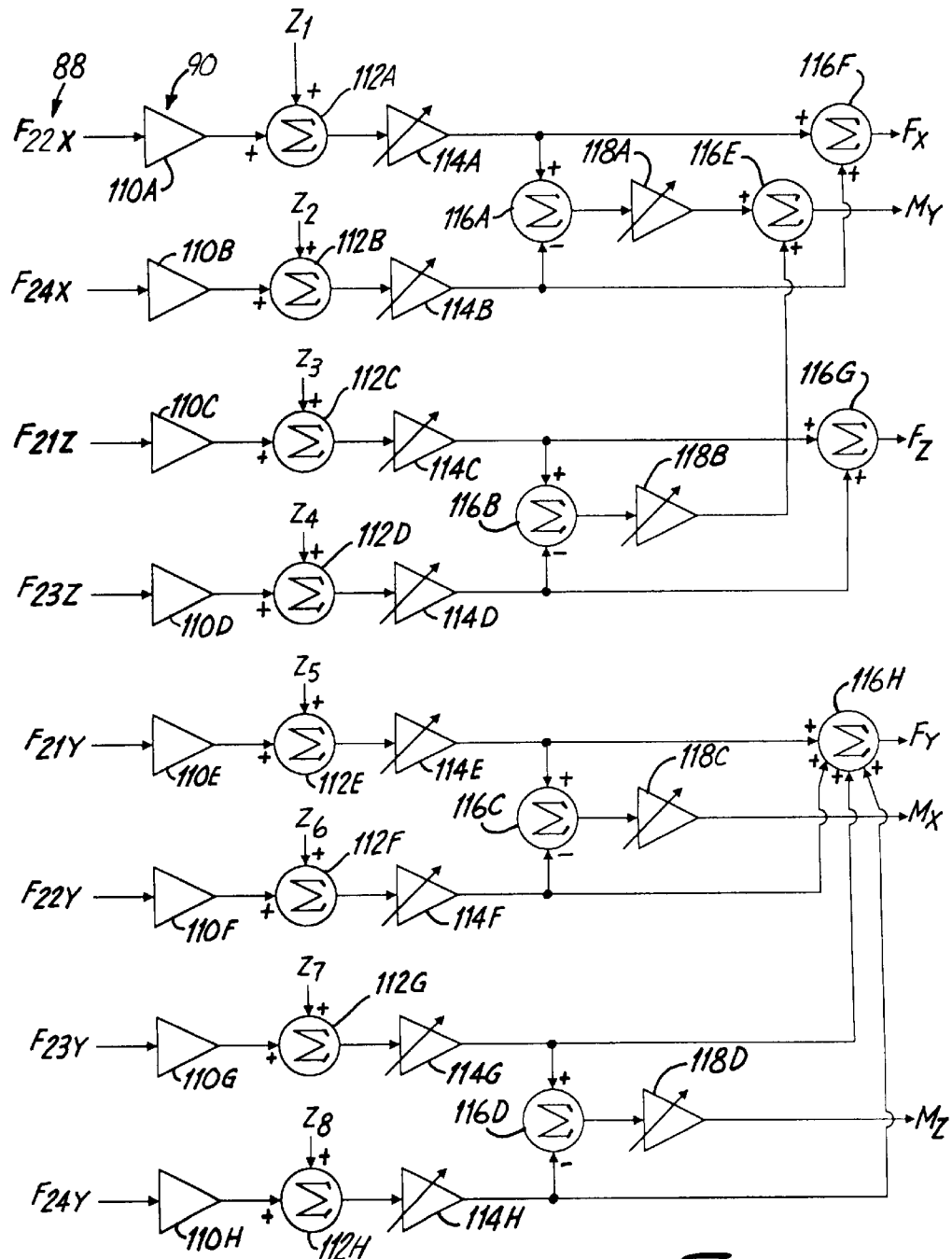
FIG. 9 is a block diagram of a scaling and geometric transformation circuit.

FIG. 9 illustrates the scaling and geometric transformation circuit 90 in detail. High impedance buffer amplifiers 110A–110H receive the output signals 88 from the slip ring assembly 84. In turn, adders 112A–112H provide a zero adjustment while, preferably, adjustable amplifiers 114A–114H individually adjust the output signals 88 so that any imbalance associated with physical differences such as variances in the wall thickness of the location of the strain sensors 40 on the tubes 21–24, or variances in the placement of the sensors 40 from tube to tube can be easily compensated. Adders 116A–116H combine the output signals from the amplifiers 114A–114H in accordance with the equations above. Adjustable amplifiers 118A–118D are provided to ensure that output signals from adders 116A–116D have the proper amplitude.

Figure 10:
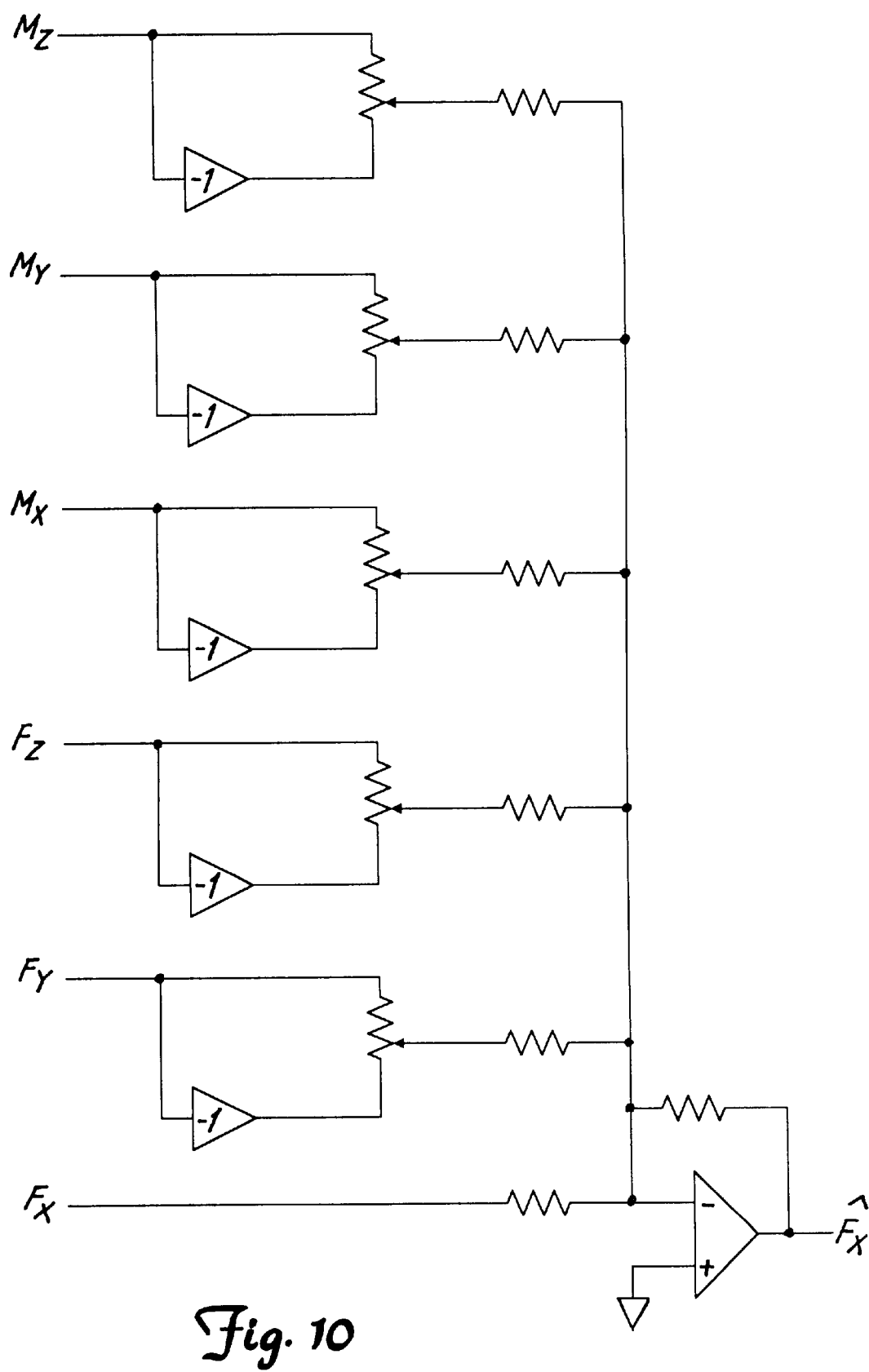
FIG. 10 is a circuit diagram of a portion of a cross-coupling matrix circuit.

As stated above, cross-coupling compensation is provide by circuit 96. By way of example, FIG. 10 illustrates cross-coupling compensation for signal $F_X$. Each of the other output signals $F_Y$, $F_Z$, $M_X$, $M_Y$ and $M_Z$ are similarly compensated for cross-coupling effects.

Figure 11:
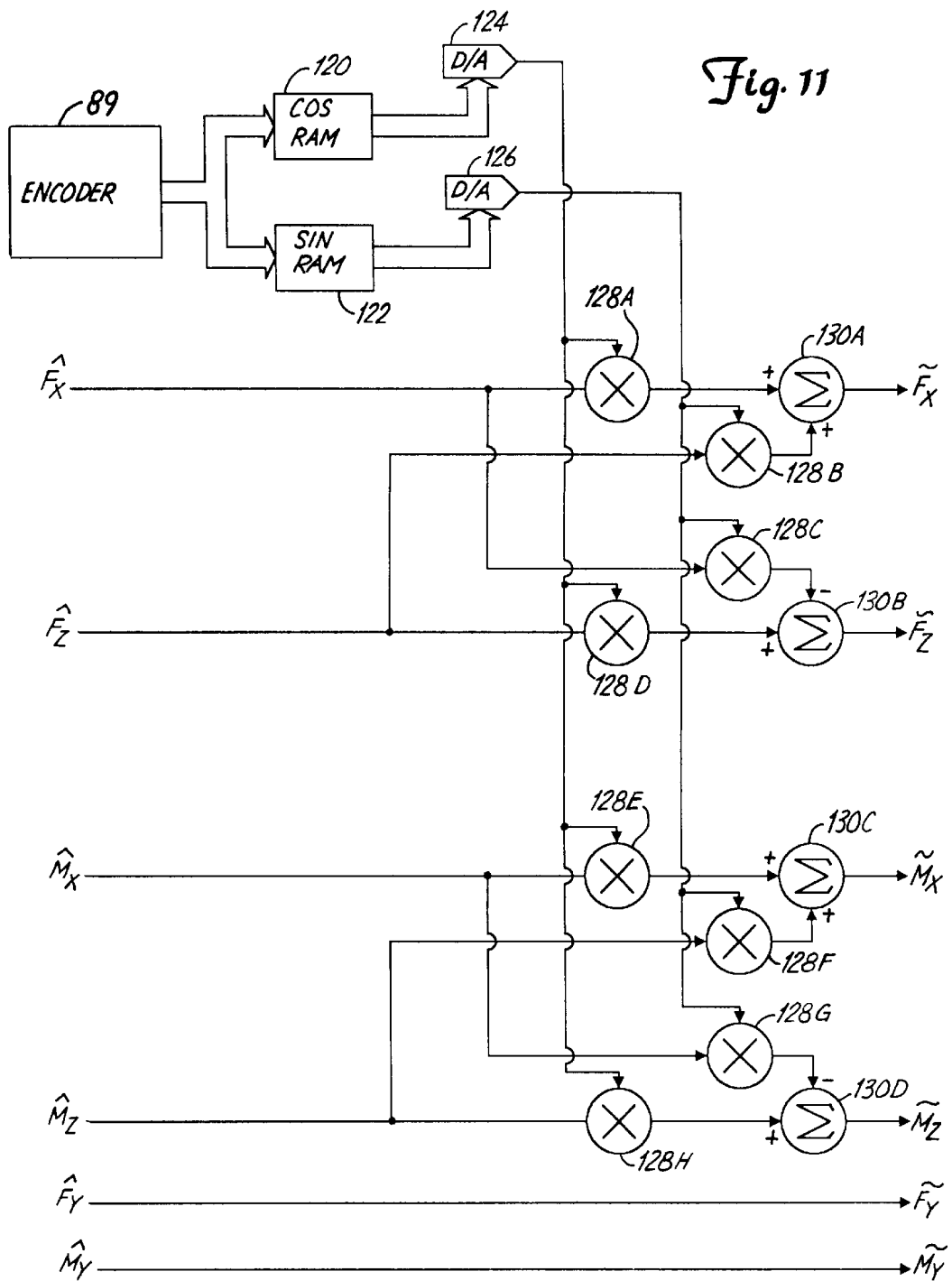
FIG. 11 is a block diagram of a coordinate transformation circuit.
Figure 13:
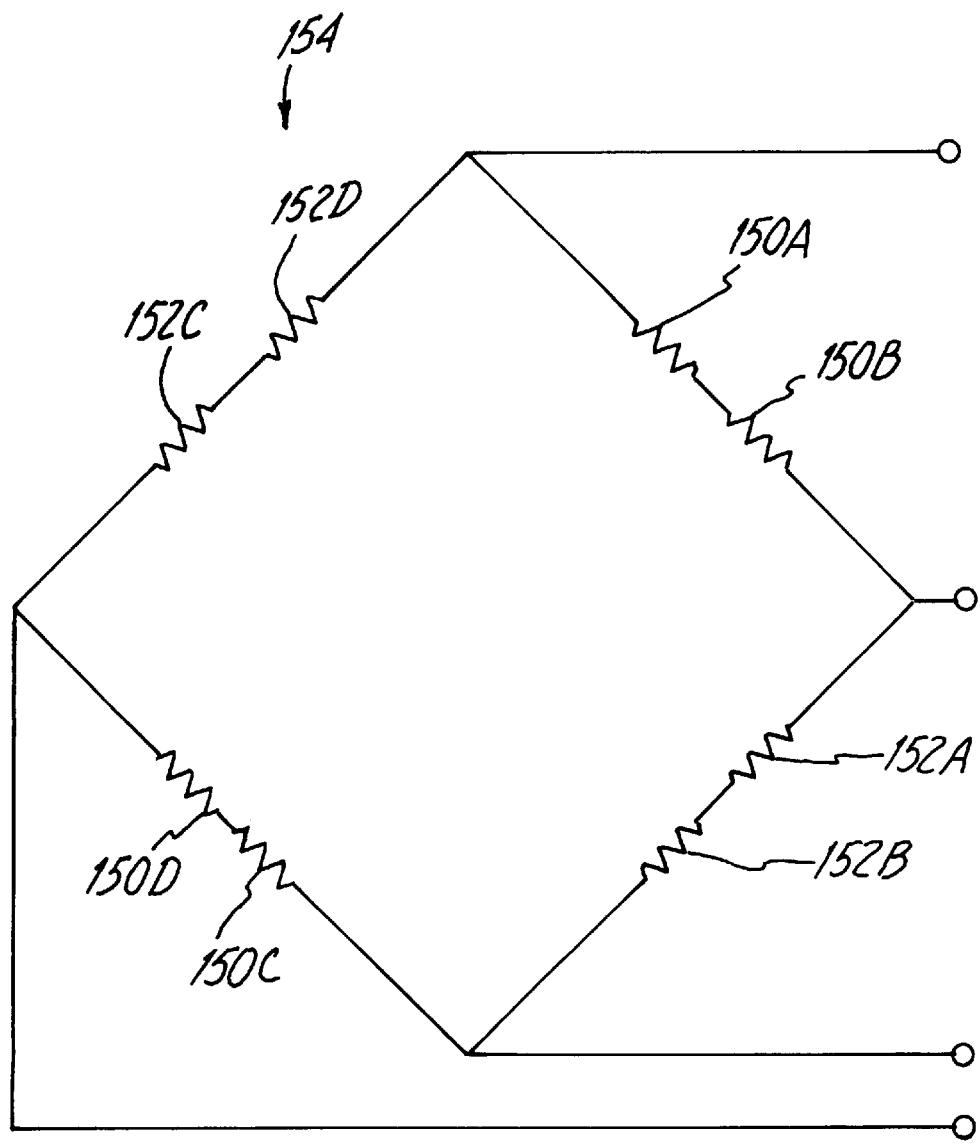
FIG. 13 is a diagram of a Wheatstone bridge.

FIG. 11 illustrates in detail the coordinate transformation circuit 102. The encoder 89 provides an index for sine and cosine digital values stored in suitable memory 120 and 122 such as RAM (random access memory). Digital-to-analog converters 124 and 126 receive the appropriate digital values and generate corresponding analog signals indicative of the angular position of the load cell 10'. Multipliers 128A–128H and adders 130A–130D combine force and moment output signals along and about the X-axis and the Z-axis so as to provide force and moment output signals 108 with respect to a static orthogonal coordinate system.

The load cells 10 and 10' described above have arranged the plurality of sensors 40 to function as shear sensors to provide an indication of shear stresses created in the radial tubes 20. If desired, the plurality of sensors 40 can be mounted to the radial tubes 20 to function as bending sensors to provide an indication of bending stresses in the radial tubes 20. In a preferred embodiment, the bending sensors can be located at a root of the tube or start of the fillet joining each tube 21–24 to the central hub 14, for example, as indicated at 140 and 142 on tube 21 in FIG. 5.

Figure 5:
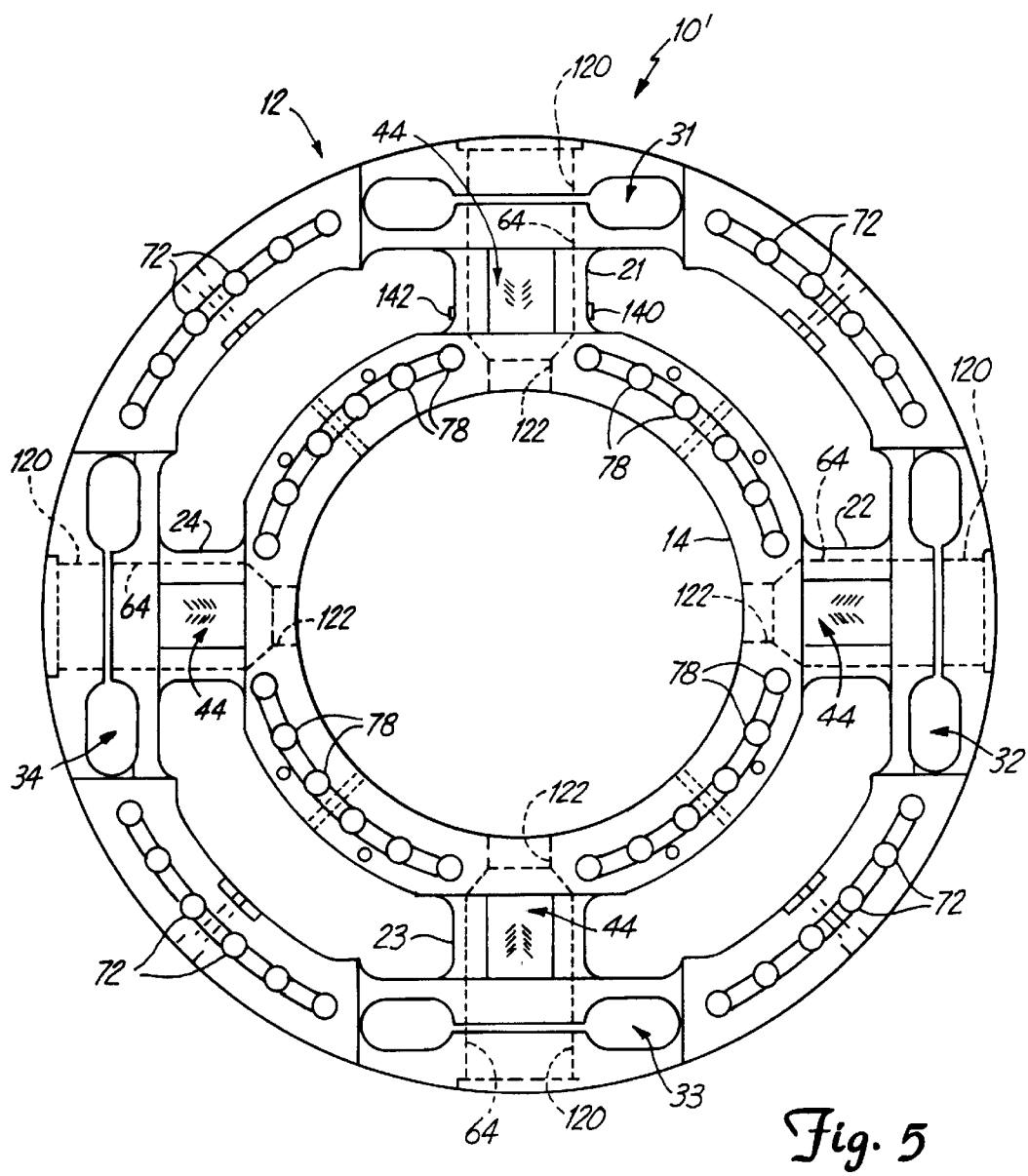
FIG. 5 is a top plan view of a second embodiment of a load cell of the present invention.
Figure 6:
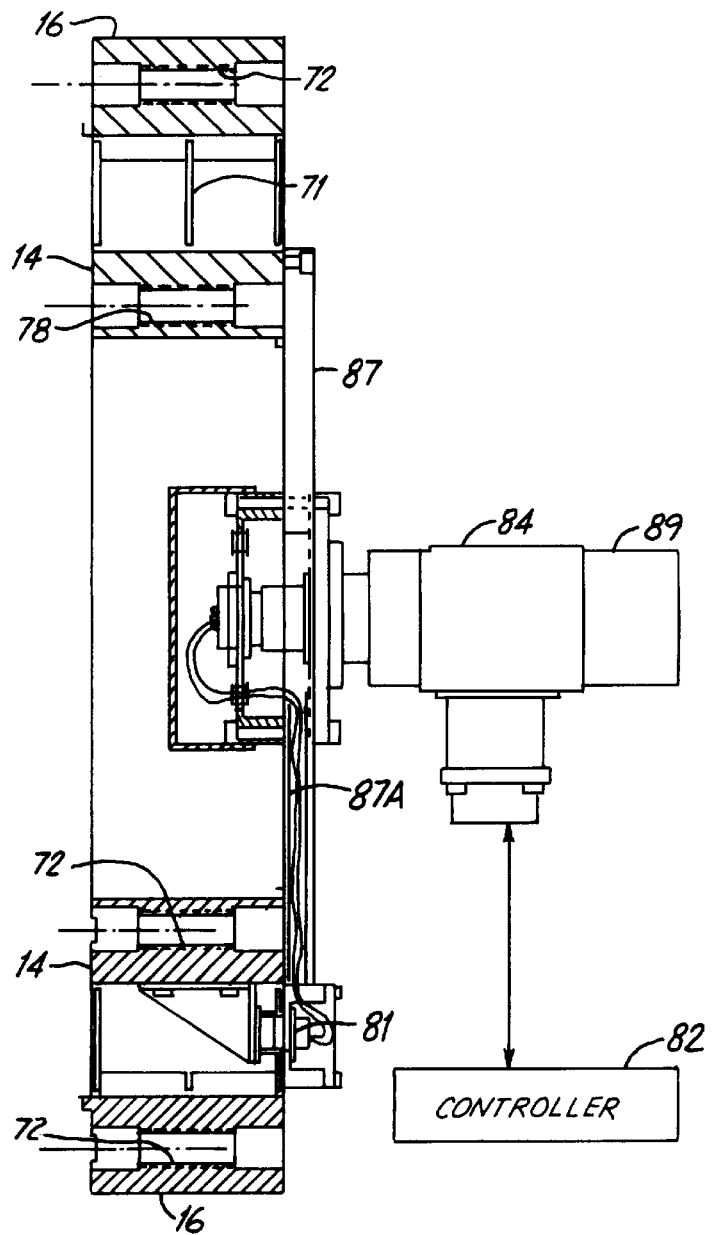
FIG. 6 is a sectional view of the load cell of FIG. 5.

A method of the present invention for making the load cell body 12 of FIGS. 1 and 5 includes fabricating from a single block of material the integral rigid central hub 14, the rigid annular ring 16 concentric with the hub 14 and radial members extending from the central hub 14 to the annular ring 16 wherein the flexure members 31–34 extend between an end of each radial member to the annular ring 16. The flexure member 31–34 are compliant for displacements of each corresponding radial member 21–24 along the corresponding longitudinal axis 21A–24A. Due to symmetry of the load cell body 12, it can be easily manufactured using conventional controlled machining processes. From a single block having two major surfaces, the load cell body 12 is secured so as to machine the first major surface and form essentially half of each of the principal components such as the central hub 14, the annular ring 16 and radial members 21–24. The block of material is then turned over to orient the second major surface to the machining apparatus. Machining operations are then performed on the second surface to form the balance of the central hub 14, the annular ring 16 and the radial members 21–24. Preferably, as stated above, the radial members 21–24 are machined to have a non-rectangular outer surface 60 with flat, orthogonally arranged sides 66A, 66B, 68A and 68D.

Figure 12:
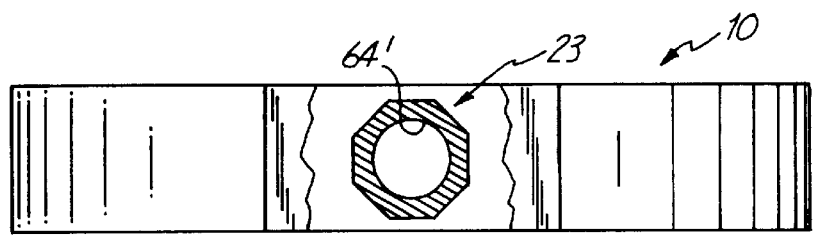
FIG. 12 is a side elevational view of the load cell with a portion removed to show an alternative radial tube in section.

The method further includes forming a bore 64 within each radial member 21–24 along the corresponding longitudinal axis 21A–24A to form a tubular structure, wherein the sensitivity of the load cell body 12 is a function of the diameters of the bores 64 formed in the radial members 21–24. Referring to FIGS. 2 and 12, bores 64 and 64' in tube 23 are of different size. By varying the diameter of the bores in the tubes 21–24, the thickness of the wall of the tubes can be adjusted. In a preferred embodiment, apertures 120 (FIG. 1) are formed in the annular ring 16 and are aligned with the bores 64 of the tubes 21–24. Preferably, the apertures 120 are of at least the same diameter of the bores 64 in the tubes 21–24 and are formed just prior to making the bores 64 by drilling through the annular ring 16 toward the central hub 14. Forming the apertures 120 also in the annular ring 16 allows the sensitivity of the load cell body 12 to be easily adjusted since the bores 64 can be easily formed by drilling through the annular ring 16 toward the central hub 14.

In a further preferred embodiment as illustrated in FIG. 5, the bores 64 in the radial tubes 21–24 extend also through the central hub 14, tapering slightly to smaller openings 122.

Although the present invention has been described with reference to preferred embodiments, workers skilled in the art will recognize that changes may be made in form and detail without departing from the spirit and scope of the invention.

What is claimed is:

1. A load cell body for transmitting forces and moments in plural directions, the load cell body comprising:
   an integral assembly having:
      a rigid central hub;
      a rigid annular ring concentric with the central hub and having a plurality of apertures;
      at least three radial tubes extending radially along corresponding longitudinal axes from the central hub to the annular ring wherein an aperture of the plurality of apertures is aligned with each bore of the radial tubes; and
      a flexure member extending between an end of each radial tube to the annular ring, the flexure member being compliant for displacements of each corresponding radial tube along the corresponding longitudinal axis.

2. The load cell body of claim 1 and further comprising a strain sensor mounted on selected radial tubes to measure strain therein.

3. The load cell body of claim 2 wherein the strain sensor comprises shear sensors mounted to each radial tube.

4. The load cell body of claim 3 wherein an outer surface of each radial tube includes a plurality of opposed planar surfaces and wherein the shear sensors are mounted to the planar surfaces.

5. The load cell body of claim 4 wherein each of the outer surfaces comprise a first pair of parallel planar surfaces facing in opposite directions and a second set of planar surfaces facing in opposite directions, the second set of planar surfaces being substantially orthogonal to the first set of planar surfaces such that planar surfaces of the first set and the second set are alternately disposed about each corresponding longitudinal axis and wherein the shear sensors are mounted to the planar surfaces of the first and second sets of planar surfaces.

6. The load cell body of claim 5 wherein each of the outer surfaces comprise a planar surface extending between each planar surface of the first set and the successive planar surface of the second set.

7. The load cell body of claim 5 wherein each of the outer surfaces comprise planar surfaces extending between each planar surface of the first set and the successive planar surface of the second set.

8. The load cell body of claim 5 wherein each of the outer surfaces is an octagon.

9. The load cell body of claim 5 wherein a first set of shear sensors are mounted on the first set of planar surfaces comprising a first shear sensing circuit for each tube, and a second set of shear sensors are mounted on the second set of planar surfaces comprising a second shear sensing circuit for each tube.

10. The load cell body of claim 9 wherein four radial tubes extend from the central hub to the annular ring, wherein a first pair of radial tubes are substantially aligned on a first axis, and a second pair of tubes are substantially aligned on a second axis, the first axis being substantially orthogonal to the second axis.

11. The load cell body of claim 2 wherein the strain sensor comprises a bending sensor mounted to each radial tube.

12. The load cell body of claim 1 wherein an outer surface of each radial tube is substantially cylindrical.

13. The load cell body of claim 1 wherein each bore extends through the central hub.

14. The load cell body of claim 13 wherein a diameter of an aperture formed in the central hub is less than a diameter of the corresponding bore.

15. A load cell for measuring selected components of force or moment, the load cell comprising:
a rigid central hub;
a rigid annular ring concentric with the central hub;
a plurality of radial tubes extending radially along corresponding longitudinal axes from the central hub to the annular ring; wherein each tube has a non-rectangular outer surface in section perpendicular to the longitudinal axis and includes a plurality of spaced-apart wall portions of reduced thickness to concentrate stress therein, and wherein each wall portion of reduced thickness includes a flat surface;
a flexure member extending between an end of each radial tube to the annular ring, the flexure member being compliant for displacements of each corresponding radial tube along the corresponding longitudinal axis; and
a plurality of shear sensors mounted on the flat surfaces of each radial tube at the wall portions of reduced thickness to provide output signals indicative of strain therein.

16. The load cell of claim 15 wherein the central hub, the annular ring and the plurality of radial tubes are integrally formed from a single block of material.

17. The load cell of claim 15 wherein the plurality of shear sensors comprises a quantity to provide outputs indicative of a plurality of forces or moments.

18. The load cell of claim 15 wherein each tube includes four spaced-apart wall portions of reduced thickness.

19. The load cell of claim 18 wherein the plurality of shear sensors comprises a quantity to provide outputs indicative of a plurality of forces or moments.

20. The load cell of claim 19 wherein the plurality of shear sensors comprises a quantity to provide outputs indicative of forces along a set of three orthogonal axes and moments about the set of three orthogonal axes.

21. The load cell of claim 18 wherein each tube comprises an octagon in section perpendicular to each corresponding longitudinal axis.

22. The load cell of claim 21 wherein the octagon includes eight sides of substantially equal length.

23. The load cell of claim 18 wherein the outer surface portions extending between the flat surfaces of each tube are curved.

24. A method of making a load cell body for transmitting forces and moments in plural directions, the method comprising the steps of:
fabricating from a single block of material an integral assembly with a rigid central hub, a rigid annular ring concentric with the hub, at least three radial members extending from the central hub to the annular ring wherein the flexure member extends between an end of each radial member to the annular ring, the flexure member being compliant for displacements of each corresponding radial member along a corresponding longitudinal axis of each radial member; and
forming a bore within each radial member along the corresponding longitudinal axis, wherein sensitivity of the load cell is a function of the diameters of the bores formed in the radial members.

25. The method of claim 24 wherein the step of fabricating includes forming an aperture in the annular ring aligned with a corresponding bore formed in the radial member.

26. The method of claim 24 wherein an outer surface of each radial member is substantially cylindrical.

27. The method of claim 24 wherein an outer surface of each radial member includes planar surfaces.

28. A load cell body for transmitting forces and moments in plural directions, the load cell body comprising:
an integral assembly having:
a rigid central hub;
a rigid annular ring concentric with the central hub;
at least three radial tubes extending radially along corresponding longitudinal axes from the central hub to the annular ring, wherein an outer surface of each radial tube includes a plurality of opposed planar surfaces;
a flexure member extending between an end of each radial tube to the annular ring, the flexure member being compliant for displacements of each corresponding radial tube along the corresponding longitudinal axis; and
a strain sensor mounted on selected radial tubes to measure strain therein, wherein each strain sensor comprises shear sensors mounted to each of the plurality of opposed planar surfaces.

29. The load cell body of claim 28 wherein each of the outer surfaces comprises a first pair of parallel planar surfaces facing in opposite directions and a second set of planar surfaces facing in opposite directions, the second set of planar surfaces being substantially orthogonal to the first set of planar surfaces such that planar surfaces of the first set and the second set are alternately disposed about each corresponding longitudinal axis and wherein the shear sensors are mounted to the planar surfaces of the first and second sets of planar surfaces.

30. The load cell body of claim 28 wherein each of the outer surfaces comprise a planar surface extending between each planar surface of the first set and the successive planar surface of the second set.

31. The load cell body of claim 28 wherein each of the outer surfaces comprise planar surfaces extending between each planar surface of the first set and the successive planar surface of the second set.

32. The load cell body of claim 28 wherein each of the outer surfaces is an octagon.

33. The load cell body of claim 28 wherein a first set of shear sensors are mounted on the first set of planar surfaces comprising a first shear sensing circuit for each tube, and a second set of shear sensors are mounted on the second set of planar surfaces comprising a second shear sensing circuit for each tube.

34. The load cell body of claim 33 wherein four radial tubes extend from the central hub to the annular ring, wherein a first pair of radial tubes are substantially aligned on a first axis, and a second pair of tubes are substantially aligned on a second axis, the first axis being substantially orthogonal to the second axis.

35. A load cell for measuring selected components of force or moment, the load cell comprising:

a rigid central hub;

a rigid annular ring concentric with the central hub;

a plurality of radial tubes extending radially along corresponding longitudinal axes from the central hub to the annular ring; wherein each tube has a non-rectangular outer surface in section perpendicular to the longitudinal axis and includes four spaced-apart wall portions of reduced thickness to concentrate stress therein;

a flexure member extending between an end of each radial tube to the annular ring, the flexure member being compliant for displacements of each corresponding radial tube along the corresponding longitudinal axis; and a plurality of shear sensors mounted on each radial tube at the wall portions of reduced thickness to provide output signals indicative of strain therein.

* * * * *

UNITED STATES PATENT AND TRADEMARK OFFICE
CERTIFICATE OF CORRECTION

PATENT NO. : 6,038,933
DATED : March 21, 2000
INVENTOR(S) : Richard A. Meyer

It is certified that error appears in the above-identified patent and that said Letters Patent is hereby corrected as shown below:

```
Col. 9, line 11, delete "comprise" and insert
--comprises--.
Col. 9, line 21, delete "comprise" and insert
--comprises--.
Col. 9, line 25, delete "comprise" and insert
--comprises--.
Col. 9, line 31, delete "are" and insert --is--.
Col. 9, line 33, delete "are" and insert --is--.
Col. 9, line 38, delete "are" and insert --is--.
Col. 9, line 39, delete "are" and insert --is--.
Col. 11, line 14, delete "comprise" and insert
--comprises--.
Col. 11, line 18, delete "comprise" and insert
--comprises--.
Col. 11, line 24, delete "are" and insert --is--.
Col. 11, line 26, delete "are" and insert --is--.
Col. 12, line 3, delete "are" and insert --is--.
Col. 12, line 4, delete "are" and insert --is--.
```

Signed and Sealed this

Twenty-fourth Day of April, 2001

Attest:

NICHOLAS P. GODICI

Attesting Officer

Acting Director of the United States Patent and Trademark Office